United States Patent Office 3,169,849
Patented Feb. 16, 1965

3,169,849
METHOD FOR CONTROLLING GROWTH OF UNDESIRED VEGETATION
Alan J. Lemin, Richland Township, Kalamazoo County, Mich., assignor to The Upjohn Company, Kalamazoo, Mich., a corporation of Michigan
No Drawing. Filed July 9, 1958, Ser. No. 747,362
12 Claims. (Cl. 71—2.6)

The present invention relates to a method of controlling undesired vegetation and to compositiosn useful therein, and is more particularly concerned with the use of ethers of hydroxybenzoic acid esters for the control of undesired vegetation and with novel herbicidal compositions containing said ethers.

In accordance with the present invention it has been discovered that the compounds having the formula:

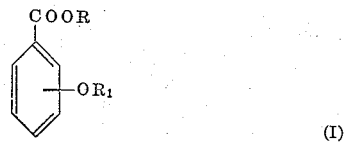

(I)

wherein R and $R_1$ represent lower aliphatic hydrocarbon radicals, such that the total number of carbon atoms in the radicals R and $R_1$ is not less than five and not more than twelve, are effective for the control of undesired vegetation. The term "lower aliphatic hydrocarbon radical" is intended to mean an acyclic or cyclic aliphatic hydrocarbon radical containing up to eleven carbon atoms, which radical can be saturated or unsaturated. Such radicals include alkyl radicals, for example, methyl, ethyl, propyl, butyl, amyl, hexyl, heptyl, octyl, nonyl, decyl, undecyl, and isomeric forms thereo; alkenyl radicals, for example, allyl, butenyl, pentenyl, hexenyl, heptenyl, octenyl, monenyl, decenyl, undecenyl, and isomeric forms thereof; alkynyl radicals, for example, ethnyl, propynyl, butynyl, pentynyl, hexynyl, heptynyl, octynyl, nonynyl, decynyl, undecynyl, and isomeric forms thereof; and cycloaliphatic radicals, for example, cyclobutyl, cyclopentyl, cyclopentenyl, methylcyclopentyl, cyclohexyl, dimethylcyclohexyl, cycloheptyl, and isomeric forms thereof.

It is an object of the invention to provide novel herbicidal compositions which contain as active ingredient at least one of the compounds of the Formul I. It is a further object of the invention to provide a method of controlling undesired vegetation by applying to such vegetation at least one of the compounds having the Formula I. Other objects of the invention will be apparent to those skilled in the art to which this invention pertains.

The preparation of many of the compounds included within the Formula I has been described in the literature although it has not previously been recognized that these compounds possess herbicidal activity. The previously known compounds having the Formula I include n-butyl 2-methoxy-benzoate, n-amyl 2-methoxybenzoate, ethyl 3-n-butoxybenzoate, ethyl 3-n-amyloxybenzoate, methyl 4-n-butoxybenzoate, methyl 4-isobutoxybenzoate, methyl 4-sec-butoxybenzoate, methyl 4-n-amyloxybenzoate, methyl 4-isoamyloxybenzoate, methyl 4-n-hexyloxybenzoate, methyl 4-n-octyloxybenzoate, ethyl 4-n-propoxybenzoate, ethyl 4-isopropoxybenzoate, ethyl 4-n-butoxybenzoate, ethyl 4-isobutoxybenzoate, ethyl 4-sec-butoxybenzoate, ethyl 4-n-amyloxybenzoate, ethyl 4-isoamyloxybenzoate, ethyl 4-n-hexyloxybenzoate, ethyl 4-n-heptyloxybenzoate, ethyl 4-n-octyloxybenzoate, ethyl 4-(1-methylheptyloxy)benzoate, ethyl 4-isooctyloxybenzoate, ethyl 4-n-nonyloxybenzoate, ethyl 4-n-decyloxybenzoate, n-propyl 4-ethoxybenzoate, n-butyl 4-methoxybenzoate, isobutyl 4-methoxybenzoate, tert-butyl 4-methoxybenzoate, n-amyl 4-methoxybenzoate, isoamyl 4-methoxybenzoate, n-heptyl 4-methoxybenzoate, ethyl 2-allyloxybenzoate, allyl 2-allyloxybenzoate, n-butyl 3-(2-methallyloxy)benzoate, ethyl 4-allyloxybenzoate, ethyl 4-(1-methallyloxy)benzoate, ethyl 4-(2-butenyloxy)benzoate, ethyl 4-(1-ethylallyloxy)benzoate, ethyl 4-(2-pentenyloxy)benzoate, ethyl 4-(1-methyl-2-butenyloxy)benzoate, ethyl 4-(3-methyl-2-butenyloxy)benzoate, ethyl 4-(1-propylallyloxy)benzoate, ethyl 4-(2-hexenyloxy)benzoate, butyl 4-(2-methallyloxy)benzoate, 3-butynyl 4-methoxybenzoate, cyclohexyl 2-methoxybenzoate, cyclohexyl 2-ethoxybenzoate, cyclohexyl 3-methoxybenzoate, cyclohexyl 3-ethoxybenzoate, cyclohexyl 4-methoxybenzoate, cyclohexyl 4-ethoxybenzoate, methyl 4-cyclohexyloxybenzoate, ethyl 4-cyclohexyloxybenzoate, ethyl 4-cyclopentyloxybenzoate, and 1-methylheptyl 2-methoxybenzoate.

Many of the compounds which are included within the Formula I are novel. The novel compounds include ethyl 2-n-propoxybenzoate, ethyl 2-n-propoxybenzoate, ethyl 2-n-heptyloxybenzoate, n-propyl 2-n-propoxybenzoate, n-propyl 2-n-butoxybenzoate, n-propyl 2-n-amyloxybenzoate, n-propyl 2-n-hexyloxybenzoate, n-propyl 2-n-heptyloxybenzoate, n-butyl 2-ethoxybenzoate, n-butyl 2-n-propoxybenzoate, n-butyl 2-n-butoxybenzoate, n-amyl 2-ethoxybenzoate, n-amyl 2-n-propoxybenzoate, n-amyl 2-n-amyloxybenzoate, n-amyl 2-n-hexyloxybenzoate, n-amyl 2-n-heptyloxybenzoate, isoamyl 2-n-propoxybenzoate, n-hexyl 2-ethoxybenzoate, n-hexyl 2-n-propoxybenzoate, n-hexyl 2-n-butoxybenzoate, n-butyl 4-n-propoxybenzoate, n-butyl 4-n-amyloxybenzoate, n-propyl 2-allyloxybenzoate, n-butyl 2-allyloxybenzoate, n-amyl 2-allyloxybenzoate, isoamyl 2-allyloxybenzoate, n-hexyl 2-allyloxybenzoate, n-octyl 2-allyloxybenzoate, n-butyl 2-(2-methallyloxy)benzoate, n-butyl 4-allyloxybenzoate, n-amyl 4-allyloxybenzoate, n-hexyl 4-allyloxybenzoate, n-butyl 3-allyloxybenzoate, and n-butyl 3-n-propoxybenzoate.

The novel compounds of Formula I can be prepared by methods which are well-known in the art. Thus the compounds of Formula I can be prepared by etherification of the corresponding hydroxybenzoic esters having the formula:

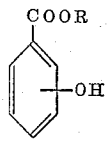

where R has the significance hereinbefore defined, using conventional methods for the etherification of phenols. For example, the hydroxybenzoic acid esters of the above formula can be reacted with a halide of the formula $R_1X$, wherein $R_1$ has the significance hereinbefore defined and X represents a halogen atom, in the presence of a base such as an alkali metal hydroxide, an alkali metal carbonate, an alkali metal alkoxide, and the like. Alternatively, the compounds of Formula I can be prepared by esterification of the O-ethers of hydroxybenzoic acids having the formula:

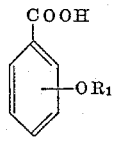

wherein $R_1$ has the significance hereinbefore described, using conventional procedures for the preparation of esters of aromatic carboxylic acids. For example, the hydroxybenzoic acid ethers of the above formula can be converted to the acid chlorides using reagents such as thionyl chloride, phosphorus trichloride phosphorus pentachloride, and the like, and the acid chlorides can be reacted with an alcohol of the formula ROH where R has the significance hereinbefore defined. Both the hydroxybenzoic acid esters and the O-ethers of hydroxybenzoic acids of the above general formulae, many of which are described in the literature, can themselves be obtained from the corresponding hydroxybenzoic acids by conventional methods. Thus the hydroxybenzoic acids can be etherified or esterified by the procedures described above. Hence, using the stages of etherification and esterification outlined above, in either sequence, it is possible to pass from a hydroxybenzoic acid to the desired compound of Formula I in two stages. Other methods for the preparation of the compounds of Formula I will be obvious to the skilled chemist.

The compounds having the Formula I above show herbicidal activity and can be used to control undesirable vegetation. By "undesirable vegetation" is meant not only plants which are commonly regarded as weeds wherever they may grow, but also certain plants which are not normally regarded as weeds except when they are found growing on land which is supporting more valuable plants, for example, horticultural and agricultural crops. The compounds having the Formula I show particularly valuable activity against undesirable vegetation such as crabgrass, white clover, oxalis, chickweed, foxtail, Poa annua, and the like, but do not cause any significant damage to desirable lawn grasses such as rye, fescue, Kentucky bluegrass, and the like, and to crops such as corn, beans, and the like, when applied in concentrations which destroy the crabgrass and other undesirable vegetation. The compounds having the Formula I find particular application for the selective control of crabgrass growing in lawns. The compounds having the Formula I in which the total number of carbon atoms in the radicals R and $R_1$ is within the range seven to nine show particularly valuable properties in this respect. Such compounds include n-butyl 2-allyloxybenzoate, n-butyl 2-n-propoxybenzoate, n-amyl 2-allyloxybenzoate, and ethyl 2-n-heptyloxybenzoate.

The herbicidal activity of the compounds having the Formula I is illustrated by the results of the following test. The test was carried out by spraying mixed plantings of seedling crabgrass and the desirable lawn grasses, rye, fescue, and bluegrass, to "run off" with an aqueous dispersion of the compound under test at a concentration of 2000 parts per million (0.2 percent). The spray solution contained approximately 300 to 600 parts per million (0.03 to 0.06 percent) of Triton X–100 (a proprietary surfactant which is an alkylaryl polyether alcohol). The plants were examined two to four weeks after the application of the test compound and their condition was recorded on an arbitrary scale of 0 (no effect) through 5 (all plants dead).

The results are recorded in Table I.

TABLE I

| Compound | Plant | | | |
|---|---|---|---|---|
| | Crabgrass | Rye | Fescue | Bluegrass |
| n-Propyl 2-allyloxybenzoate | 2 | 1 | 1 | 1 |
| n-Butyl 2-allyloxybenzoate | 3–4 | 1–2 | 1 | 1–2 |
| n-Amyl 2-allyloxybenzoate | 4–5 | 2 | 1 | 1 2 |
| Isoamyl 2-allyloxybenzoate | 3–4 | 1–2 | 0 | 0–1 |
| n-Hexyl 2-allyloxybenzoate | 3–4 | 1 2 | 0–1 | 2 |
| n-Octyl 2-allyloxybenzoate | 2–3 | 2 | 0 | 1 |
| n-Butyl 3-allyloxybenzoate | 2–3 | | | |
| n-Butyl 2-(2-methallyloxy)benzoate | 4 | | | |
| n-Butyl 4-allyloxybenzoate | 3 | 1–2 | 1–2 | 1 2 |
| n-Amyl 4-allyloxybenzoate | 5 | 1–2 | 0–1 | 1–2 |
| n-Hexyl 4-allyloxybenzoate | 5 | 1 | 2 | 2 |
| n-Butyl 4-n-propoxybenzoate | 3 | 1 | 1 | 1 |
| n-Butyl 4-n-amyloxybenzoate | 3 | 1 | 0–1 | 1 |
| Ethyl 2-n-propoxybenzoate | 2 | 1 | 0 | 0 |
| Ethyl 2-n-heptyloxybenzoate | 4 | 1–2 | 0 | 1 |
| n-Propyl 2-n-propoxybenzoate | 2–3 | 0 | 1–2 | 0 |
| n-Propyl 2-n-butoxybenzoate | 2 | 0–1 | 0 | 0 |
| n-Propyl 2-n-amyloxybenzoate | 2–3 | 0–1 | 0 | 0 |
| n-Propyl 2-n-hexyloxybenzoate | 2 | 1 | 0 | 1 |
| n-Propyl 2-n-heptyloxybenzoate | 2 | 0 | 0 | 0 |
| n-Butyl 2-ethoxybenzoate | 1–2 | 0–1 | 0 | 0–1 |
| n-Butyl 2-n-propoxybenzoate | 4–5 | 1–2 | 1 | 1 |
| n-Butyl 2-n-butoxybenzoate | 1–2 | 1 | 0 | 0 |
| n-Amyl 2-ethoxybenzoate | 1 | 0–1 | 0 | 0 |
| n-Amyl 2-n-propoxybenzoate | 5 | 0–1 | 1 | 1 |
| n-Amyl 2-n-amyloxybenzoate | 1 2 | 0 | 0–1 | 0–1 |
| n-Amyl 2-n-hexyloxybenzoate | 2 | 1 | 1 | 0–1 |
| n-Amyl 2-n-heptyloxybenzoate | 1 | 1–2 | 1–2 | 0 |
| Isoamyl 2-n-propoxybenzoate | 3–4 | 1 | 0 | 0–1 |
| n-Hexyl 2-ethoxybenzoate | 1 | 1 | 0 | 0 |
| n-Hexyl 2-n-propoxybenzoate | 3–4 | 1 | 1 2 | 2 |
| n-Hexyl 2-n-butoxybenzoate | 1 | 1–2 | 0–1 | 0 |
| n-Butyl 3-n-propoxybenzoate | 2–3 | | | |

For the selective control of undesired vegetation the compounds having the Formula I above as applied at a rate within the range of about 0.02 to about 25 pounds per acre, the preferred rate of application being about 0.2 to about ten pounds per acre.

For the non-selective control of undesired vegetation the compounds having the Formula I above are applied at a rate within the range of about one to about 50 pounds per acre, the preferred rate of application being about 2.5 to about thirty pounds per acre.

In order to achieve the maximum herbicidal effect of the compounds having the Formula I above it is necessary to formulate the compounds in compositions which can be freely applied to vegetation and evenly distributed over the surface thereof. Accordingly the method of preparation of the herbicidal compositions of the invention is a matter of importance.

The herbicidal compositions of the invention comprise as active ingredient at least one compound having the formula:

wherein R and $R_1$ represent lower aliphatic hydrocarbon radicals, such that the total number of carbon atoms in the radicals R and $R_1$ is not less than five and not more than twelve, in association with a carrier material. Where the compositions are to be employed as selective herbicides it is advantageous that the carrier material be phytonomic, that is to say, a carrier which can be applied to plants without phytotoxicity or other adverse effects. Where the compositions are to be employed as general herbicides such considerations do not apply.

The herbicidal compositions of the invention can take the form of dusts which are prepared by intimate admixture of the active ingredient with a solid carrier or extender which maintains the compositions in a dry, free-flowing state. Since the compounds having the Formula I are ordinarily liquids, the herbicidal dusts of the invention can be prepared more conveniently by adding to the solid diluent a solution of the compound in a volatile solvent such as ethanol, acetone, ether, and the like, mixing to form a paste, drying and milling. The solid carriers which can be used include the natural clays such as china clay and bentonite, minerals in the natural state such as talc, pyrophyllite, quartz, diatomaceous earth, fuller's earth, chalk, and rock phosphate, and the chemically modified minerals such as washed bentonite, precipitated calcium phosphate, precipitated calcium carbonate, and colloidal silica. The solid diluents which can be employed in the compositions also include solid artificial fertilizers. Such solid compositions can be applied to vegetation in the form of dusts by use of conventional machinery. A preferred solid composition is one which also comprises a surfactant. Such compositions can be added to water to form aqueous dispersions which can be applied to vegetation by conventional spraying machines. The surfactants which can be employed in the preparation of such compositions include alkyl sulfates and sulfonates, alkylbenzenesulfonates, sulfosuccinate esters, polyoxyethylene sulfates, polyoxyethylene sorbitan monolaurate, alkylarylpolyether sulfates, alkylarylpolyether alcohols, alkylnaphthalenesulfonates, alkyl quaternary ammonium salts, sulfated fatty acids and esters, sulfated fatty acid amides, glycerol mannitan laurate, polyalkylether condensates of fatty acids, and lignin sulfonates, the sulfates and sulfonates, of course, being used in the form of the soluble salts, for example, their sodium salts.

The herbicidal compositions of the invention also comprise aqueous emulsions. The aqueous emulsions can be prepared by dissolving a surfactant of the type noted above in a compound having the Formula I and pouring the emulsifiable concentrate so obtained into water with vigorous agitation. The aqueous emulsions of the invention can also be prepared by dissolving the active ingredient in a water-miscible solvent such as Carbitol (diethylene glycol monoethyl ether), acetone, a lower alkanol, Cellosolve (ethylene glycol monoethyl ether), dioxan, and the like, if desired, in association with a surfactant such as noted above, to obtain an emulsifiable concentrate which is poured into water with vigorous agitation. The aqueous emulsions of the invention can also be prepared by dissolving the active ingredient and a surfactant such as noted above in an organic solvent which is immiscible with water. The resulting emulsifiable concentrate is then admixed with water with vigorous agitation to form an emulsion. The water-immiscible organic solvents which are suitable for use include cyclohexanone, summer oils, aromatic hydrocarbons such as benzene, toluene, xylene, and high-boiling petroleum hydrocarbons such as kerosene, diesel oil, and the like.

The aqueous emulsions of the invention can be supplied to the user in the form of the emulsifiable concentrates described above which require dilution with water before use. Both the concentrated compositions and the diluted compositions are included within the scope of the present invention.

The compositions of the invention which are intended for use in the form of aqueous dispersions or emulsions can also comprise a humectant, that is to say, an agent which will delay the drying of the composition in contact with the vegetation to which it has been applied. Suitable humectants include glycerol, diethylene glycol, solubilized lignins such as calcium lignosulfonate, and the like.

The exact concentration of active ingredient in any of the compositions of the invention is not critical and may vary considerably, provided the active ingredient is applied to the vegetation to be treated at a rate within the range defined above. However, in general it has been found advantageous to employ concentrations of active ingredient of the order of 1,000 to 10,000 parts per million (0.1–1.0 percent) in the aqueous emulsions or dispersions used for the treatment of vegetation. The concentration of active ingredient in the concentrates from which these compositions are prepared can be as high as 99.5 percent by weight. The concentration of active ingredient in the dust formulations of the invention is limited by the generally oily nature of the compounds having the Formula I. However, the concentration of active ingredient in the dust formulations of the invention is advantageously of the order of about one to fifteen percent by weight.

The concentrations and the rates at which the compositions of the invention are applied will of course vary in accordance with factors such as the nature of the vegetation being treated, whether the treatment is a selective one, the season of the year at which the treatment is made, and the nature of the machine which is used to apply the compositions.

The compositions of the invention can also include compositions in which the active ingredients of the above Formula I are employed in combination with known herbicides. Such known herbicides include 2,4-dichlorophenoxyacetic acid, 2 - methyl - 4 - chlorophenyoxyacetic acid, 2,4,5-trichlorophenoxyacetic acid, ammonium sulfamate, ammonium thiocyanate, dinitro-o-cresol, sodium arsenite, phenylmercuric acetate, isopropyl N-phenylcarbamate, isopropyl N-(3-chlorophenyl)carbamate, 3-(p-chlorophenyl)-1,1-dimethylurea, trichloroacetic acid, 2,2-dichloropropionic acid, sodium pentachlorophenate, sodium chlorate, and chlordane.

The following examples are illustrative of the process and compositions of the present invention, but are not to be construed as limiting.

A. PREPARATION OF NOVEL COMPOUNDS OF THE FORMULA I

*Preparation 1.—n-Butyl 4-allyloxybenzoate*

A mixture of 48.5 grams (0.25 mole) of n-butyl 4-hydroxybenzoate, 33.3 grams (0.275 mole) of allyl bromide, 38 grams (0.275 mole) of anhydrous potassium carbonate and 350 milliliters of acetone was heated under reflux for sixteen hours. The resulting mixture was allowed to cool before being treated with 200 milliliters of ether and 200 milliliters of water. The mixture was shaken and the ether layer was separated, washed twice with fifty milliliters of ten percent aqueous potassium hydroxide solution, once with fifty milliliters of two percent hydrochloric acid, and then with 100-milliliter portions of water until the washings were neutral. The ethereal solution was finally dried over anhydrous sodium sulfate and evaporated to dryness. The residual oil was distilled under reduced pressure. There was thus obtained 36 grams of n-butyl 4-allyloxybenzoate in the form of a liquid having a boiling point of 110 to 113 degrees centigrade at a pressure of 0.05 millimeter of mercury; $n_D^{26} = 1.5182$.

*Analysis.*—Calcd. for $C_{14}H_{18}O_3$: C, 71.77; H, 7.74. Found: C, 71.68; H. 7.56.

*Preparation 2.—n-Amyl 4-allyloxybenzoate*

(a) PREPARATION OF N-AMYL 4-HYDROXYBENZOATE

A mixture of 69 grams (0.5 mole) of 4-hydroxybenzoic acid, 440 grams (5 mole) of n-amyl alcohol and twenty milliliters of concentrated sulfuric acid was heated under reflux for five hours. The resulting mixture was allowed to cool, treated with one liter of water and shaken. The upper layer was separated, washed twice with one-liter portions of saturated aqueous sodium bicarbonate solution and once with one liter of water. The organic layer was dried over anhydrous sodium sulfate and then distilled under reduced pressure. There was thus obtained n-amyl 4-hydroxybenzoate in the form of an oil which had a boiling point of 165 to 167 degrees centigrade at a pressure of one to 1.5 millimeters of mercury.

Analysis.—Calcd. for $C_{12}H_{16}O_3$: C, 69.21; H, 7.74. Found: C, 68.78; H, 7.95.

(b) PREPARATION OF N-AMYL 4-ALLYLOXYBENZOATE

Using the procedure described in Preparation 1, but employing 20.8 grams (0.1 mole) of n-amyl 4-hydroxybenzoate (prepared as described above), 13.4 grams (0.11 mole) of allyl bromide, 13.9 grams (0.1 mole) of anhydrous potassium carbonate and 150 milliliters of acetone, there was obtained n-amyl 4-allyloxybenzoate in the form of an oil having a boiling point of 133 to 136 degrees centrigrade at a pressure of 0.06 millimeter of mercury; $n_D^{24}=1.5141$.

Analysis.—Calcd. for $C_{15}H_{20}O_3$: C, 72.55; H, 8.12. Found: C, 72.32; H, 8.34.

*Preparation 3.—n-Hexyl 4-allyloxybenzoate* n-Hexyl 4-hydroxybenzoate was obtained by the process described in Preparation 2(a), but substituting n-hexyl alcohol for n-amyl alcohol, in the form of an oil having a boiling point of 154 to 156 degrees centigrade at a pressure of 0.25 millimeter of mercury. Using the procedure described in Preparation 1, but substituting the n-hexyl 4-hydroxybenzoate prepared as described above for n-amyl 4-hydroxybenzoate, there was obtained n-hexyl 4-allyloxybenzoate in the form of an oil having a boiling point of 127.5 to 128.5 degrees centigrade at a pressure of 0.2 millimeter of mercury.

Analysis.—Calcd. for $C_{16}H_{22}O_3$: C, 73.25; H, 8.45. Found: C, 73.53; H, 8.64.

*Preparation 4.—n-Propyl 2-allyloxybenzoate*

Using the procedure described in Preparation 1, but substituting n-propyl salicylate for n-butyl 4-hydroxybenzoate, there was obtained n-propyl 2-allyloxybenzoate in the form of an oil having a boiling point of 96 to 102 degrees centigrade at a pressure of 0.1 millimeter of mercury; $n_D^{24}=1.5176$.

Analysis.—Calcd. for $C_{13}H_{16}O_3$: C, 70.89; H, 7.32. Found: C, 68.95; H, 7.22.

*Preparation 5.—n-Butyl 2-allyloxybenzoate*

Using the procedure described in Preparation 1, but substituting n-butyl salicylate for n-butyl 4-hydroxybenzoate, there was obtained n-butyl 2-allyloxybenzoate in the form of an oil which had a boiling point of 113 degrees centigrade at a pressure of 0.1 millimeter of mercury; $n_D^{24}=1.5145$.

Analysis.—Calcd. for $C_{14}H_{18}O_3$: C, 71.77; H, 7.74. Found: C, 71.25; H, 7.73.

*Preparation 6.—n-Amyl 2-allyloxybenzoate* n-Amyl salicylate was obtained, using the procedure described in Preparation 2(a) but substituting salicylic acid for 4-hydroxybenzoic acid, in the form of an oil having a boiling point of 112 degrees centigrade at a pressure of 0.15 millimeter of mercury. Using the procedure described in Preparation 1, but substituting n-amyl salicylate for n-butyl 4-hydroxybenzoate, there was obtained n-amyl 2-allyloxybenzoate in the form of an oil having a boiling point of 120 degrees centigrade at a pressure of 0.25 millimeter of mercury; $n_D^{24}=1.5099$.

Analysis.—Calcd. for $C_{15}H_{20}O_3$: C, 72.55; H, 8.12. Found: C, 72.59; H, 8.15.

*Preparation 7.—Isoamyl 2-allyloxybenzoate*

Using the procedure described in Preparation 1, but substituting isoamyl salicylate for n-butyl 4-hydroxybenzoate, there was obtained isoamyl 2-allyloxybenzoate in the form of an oil having a boiling point of 101 to 103 degrees centigrade at a pressure of 0.1 millimeter of mercury; $n_D^{24}=1.5078$.

Analysis.—Calcd. for $C_{15}H_{20}O_3$: C, 72.55; H, 8.12. Found: C, 71.93; H, 7.87.

*Preparation 8.—n-Hexyl 2-allyloxybenzoate* n-Hexyl salicylate was obtained, using the procedure described in Preparation 2(a) but substituting salicylic acid for 4-hydroxybenzoic acid and n-hexyl alcohol for n-amyl alcohol, in the form of an oil having a boiling point of 109 to 113 degrees centigrade at a pressure of 0.4 millimeter of mercury. Using the procedure described in Preparation 1, but substituting n-hexyl salicylate for n-butyl 4-hydroxybenzoate, there was obtained n-hexyl 2-allyloxybenzoate in the form of an oil having a boiling point of 124 to 127 degrees centigrade at a pressure of 0.2 millimeter of mercury.

Analysis.—Calcd. for $C_{16}H_{22}O_3$: C, 73.25; H, 8.45. Found: C, 72.11; H, 8.36.

*Preparation 9.—n-Octyl 2-allyloxybenzoate* n-Octyl salicylate was obtained, using the procedure described in Preparation 2(a) but substituting salicylic acid for 4-hydroxybenzoic acid and n-octyl alcohol for n-amyl alcohol, in the form of an oil having a boiling point of 121 to 124 degrees centigrade at a pressure of 0.19 millimeter of mercury. Using the procedure described in Preparation 1, but substituting n-octyl salicylate for n-butyl 4-hydroxybenzoate and methyl ethyl ketone for acetone, there was obtained n-octyl 2-allyloxybenzoate in the form of an oil having a boiling point of 137 to 139 degrees centigrade at a pressure of 0.1 millimeter of mercury; $n_D^{30}=1.5000$.

Analysis.—Calcd. for $C_{18}H_{26}O_3$: C, 74.44; H, 9.03. Found: C, 74.16; H, 8.98.

*Preparation 10.—n-Butyl 4-n-propoxybenzoate*

Using the procedure described in Preparation 1, but substituting 1-bromopropane for allyl bromide, there was obtained n-butyl 4-n-propoxybenzoate in the form of an oil having a boiling point of 110 to 111 degrees centigrade at a pressure of 0.2 millimeter of mercury; $n_D^{23}=1.5058$.

Analysis.—Calcd. for $C_{14}H_{20}O_3$: C, 71.16; H, 8.53. Found: C, 71.21; H, 8.48.

*Preparation 11.—n-Butyl 4-n-amyloxybenzoate*

Using the procedure described in Preparation 1, but substituting n-amyl bromide for allyl bromide, there was obtained n-butyl 4-n-amyloxybenzoate in the form of an oil having a boiling point of 135 to 138 degrees centigrade at a pressure of 0.5 millimeter of mercury; $n_D^{22}=1.5090$.

Analysis.—Calcd. for $C_{16}H_{24}O_3$: C, 72.69; H, 9.15. Found: C, 71.67; H, 8.86.

*Preparation 12.—Ethyl 2-n-propoxybenzoate*

A mixture of 33.2 grams (0.2 mole) of ethyl salicylate, 27.06 grams (0.22 mole) of 1-bromopropane, 27.6 grams (0.2 mole) of anhydrous potassium carbonate, 33 grams (0.22 mole) of sodium iodide and 280 milliliters of acetone was heated under reflux for sixteen hours. The mixture was allowed to cool, one liter of water was added and the product was shaken with 500 milliliters of ether. The ethereal solution was washed successively with two portions, each of 100 milliliters, of ten percent aqueous sodium hydroxide solution, fifty milliliters of two percent hydrochloric acid, and with portions of 200 milliliters of water until the washings were neutral. The ethereal solution was dried over anhydrous sodium sulfate and the solution was evaporated to dryness. The oily residue was distilled under reduced pressure to yield 2.35 grams of ethyl 2-n-propoxybenzoate in the form of an oil having a boiling point of 97 to 101 degrees centigrade at a pressure of 0.8 millimeter of mercury; $n_D^{29}=1.5049$.

Analysis.—Calcd. for $C_{12}H_{16}O_3$: C, 69.21; H, 7.74. Found: C, 68.77; H, 7.70.

Preparation 13.—Ethyl 2-n-heptyloxybenzoate

Using the procedure described in Preparation 12, but substituting n-heptyl bromide for 1-bromopropane, there was obtained ethyl 2-n-heptyloxybenzoate in the form of an oil having a boiling point of 110 to 114 degrees centigrade at a pressure of 0.15 millimeter of mercury; $n_D^{28}=1.4955$.

Analysis.—Calcd. for $C_{16}H_{24}O_3$: C, 72.69; H, 9.15. Found: C, 72.59; H, 9.13.

Preparation 14.—n-Propyl 2-n-propoxybenzoate

Using the procedure described in Preparation 1, but substituting n-propyl salicylate for n-butyl 4-hydroxybenzoate and 1-bromopropane for allyl bromide, there was obtained n-propyl 2-n-propoxybenzoate in the form of an oil having a boiling point of 97 degrees centigrade at a pressure of 0.15 millimeter of mercury; $n_D^{27}=1.5052$.

Analysis.—Calcd. for $C_{13}H_{18}O_3$: C, 70.24; H, 8.16. Found: C, 69.82; H, 8.14.

Preparation 15.—n-Propyl 2-n-butoxybenzoate

Using the procedure described in Preparation 1, but substituting n-propyl salicylate for n-butyl 4-hydroxybenzoate and n-butyl bromide for allyl bromide, there was obtained n-propyl 2-n-butoxybenzoate in the form of an oil having a boiling point of 100 to 104 degrees centigrade at a pressure of 0.05 millimeter of mercury; $n_D^{27}=1.5012$.

Analysis.—Calcd. for $C_{14}H_{20}O_3$: C, 71.16; H, 8.53. Found: C, 70.97; H, 8.68.

Preparation 16.—n-Propyl 2-n-amyloxybenzoate

Using the procedure described in Preparation 1, but substituting n-propyl salicylate for n-butyl 4-hydroxybenzoate and n-amyl bromide for allyl bromide, there was obtained n-propyl 2-n-amyloxybenzoate in the form of an oil having a boiling point of 115 to 117 degrees centigrade at a pressure of 0.1 millimeter of mercury; $n_D^{27}=1.4980$.

Analysis.—Calcd. for $C_{15}H_{22}O_3$: C, 71.97; H, 8.86. Found: C, 72.15; H, 8.76.

Preparation 17.—n-Propyl 2-n-hexyloxybenzoate

Using the procedure described in Preparation 1, but substituting n-propyl salicylate for n-butyl 4-hydroxybenzoate and n-hexyl bromide for allyl bromide, there was obtained n-propyl 2-n-hexyloxybenzoate in the form of an oil having a boiling point of 118 degrees centigrade at a pressure of 0.06 millimeter of mercury; $n_D^{20.5}=1.4979$.

Analysis.—Calcd. for $C_{16}H_{24}O_3$: C, 72.69; H, 9.15. Found: C, 73.07; H, 9.56.

Preparation 18.—n-Propyl 2-n-heptyloxybenzoate

Using the procedure described in Preparation 1, but substituting n-propyl salicylate for n-butyl 4-hydroxybenzoate, n-heptyl bromide for allyl bromide and methyl ethyl ketone for acetone, there was obtained n-propyl 2-n-heptyloxybenzoate in the form of an oil having a boiling point of 130 to 131 degrees centigrade at a pressure of 0.2 millimeter of mercury; $n_D^{27}=1.4927$.

Analysis.—Calcd. for $C_{17}H_{26}O_3$: C, 73.34; H, 9.41. Found: C, 73.27; H, 9.34.

Preparation 19.—n-Butyl 2-ethoxybenzoate

Using the procedure described in Preparation 1, but substituting n-butyl salicylate for n-butyl 4-hydroxybenzoate, ethyl iodide for allyl bromide and methyl ethyl ketone for acetone, there was obtained n-butyl 2-ethoxybenzoate in the form of an oil having a boiling point of 96 to 103 degrees centigrade at a pressure of 0.1 millimeter of mercury; $n_D^{28}=1.5040$.

Analysis.—Calcd. for $C_{13}H_{18}O_3$: C, 70.24; H, 8.16. Found: C, 70.66; H, 7.73.

Preparation 20.—n-Butyl 2-n-propoxybenzoate

Using the procedure described in Preparation 1, but substituting n-butyl salicylate for n-butyl 4-hydroxybenzoate and 1-bromopropane for allyl bromide, there was obtained n-butyl 2-n-propoxybenzoate in the form of an oil having a boiling point of 116 to 119 degrees centigrade at a pressure of 0.5 millimeter of mercury; $n_D^{27}=1.5028$.

Analysis.—Calcd. for $C_{14}H_{20}O_3$: C, 71.16; H, 8.53. Found: C, 70.89; H, 8.18.

Preparation 21.—n-Butyl 2-n-butoxybenzoate

Using the procedure described in Preparation 12, but substituting n-butyl salicylate for ethyl salicylate, n-butyl bromide for 1-bromopropane and methyl ethyl ketone for acetone, there was obtained n-butyl 2-n-butoxybenzoate in the form of an oil having a boiling point of 105 to 107 degrees centigrade at a pressure of 0.12 millimeter of mercury; $n_D^{28}=1.5043$.

Analysis.—Calcd. for $C_{15}H_{22}O_3$: C, 71.79; H, 8.86. Found: C, 71.29; H, 7.78.

Preparation 22.—n-Amyl 2-ethoxybenzoate

Using the procedure described in Preparation 1, but substituting n-amyl salicylate for n-butyl 4-hydroxybenzoate, ethyl iodide for allyl bromide and methyl ethyl ketone for acetone, there was obtained n-amyl 2-ethoxybenzoate in the form of an oil having a boiling point of 110 to 112 degrees centigrade at a pressure of 0.15 millimeter of mercury; $n_D^{27}=1.5031$.

Analysis.—Calcd. for $C_{14}H_{20}O_3$: C, 71.16; H, 8.53. Found: C, 69.93; H, 8.26.

Preparation 23.—n-Amyl 2-n-propoxybenzoate

Using the procedure described in Preparation 1, but substituting n-amyl salicylate for n-butyl 4-hydroxybenzoate and 1-bromopropane for allyl bromide, there was obtained n-amyl 2-n-propoxybenzoate in the form of an oil having a boiling point of 107 degrees centigrade at a pressure of 0.2 millimeter of mercury; $n_D^{27}=1.4994$.

Analysis.—Calcd. for $C_{15}H_{22}O_3$: C, 71.97; H, 8.86. Found: C, 71.81; H, 9.22.

Preparation 24.—n-Amyl 2-n-amyloxybenzoate

Using the procedure described in Preparation 1, but substituting n-amyl salicylate for n-butyl 4-hydroxybenzoate and n-amyl bromide for allyl bromide, there was obtained n-amyl 2-n-amyloxybenzoate in the form of an oil having a boiling point of 136 to 147 degrees centigrade at a pressure of 0.85 millimeter of mercury; $n_D^{24}=1.4956$.

Analysis.—Calcd. for $C_{17}H_{26}O_3$: C, 73.34; H, 9.41. Found: C, 72.75; H, 9.05.

Preparation 25.—n-Amyl 2-n-hexyloxybenzoate

Using the procedure described in Preparation 1, but substituting n-amyl salicylate for n-butyl 4-hydroxybenzoate and n-hexyl bromide for allyl bromide, there was obtained n-amyl 2-n-hexyloxybenzoate in the form of an oil having a boiling point of 163 to 165 degrees centigrade at a pressure of 0.4 millimeter of mercury; $n_D^{27}=1.4887$.

Preparation 26.—n-Amyl 2-n-heptyloxybenzoate

Using the procedure described in Preparation 1, but substituting n-amyl salicylate for n-butyl 4-hydroxybenzoate and n-heptyl bromide for allyl bromide, there was obtained n-amyl 2-n-heptyloxybenzoate in the form of an oil having a boiling point of 158 to 160 degrees centigrade at a pressure of 0.3 millimeter of mercury; $n_D^{27}=1.4929$.

Preparation 27.—Isoamyl 2-n-propoxybenzoate

Using the procedure described in Preparation 1, but substituting isoamyl salicylate for n-butyl 4-hydroxybenzoate, 1-bromopropane for allyl bromide and methyl ethyl ketone for acetone, there was obtained isoamyl 2-n-propoxybenzoate in the form of an oil having a boiling point of 102 to 103 degrees centigrade at a pressure of 0.1 millimeter of mercury; $n_D^{25} = 1.4968$.

Analysis.—Calcd. for $C_{15}H_{22}O_3$: C, 71.97; H, 8.86. Found: C, 72.18; H, 8.82.

Preparation 28.—n-Hexyl 2-ethoxybenzoate

Using the procedure described in Preparation 1, but substituting n-hexyl salicylate for n-butyl 4-hydroxybenzoate, ethyl iodide for allyl bromide and methyl ethyl ketone for acetone, there was obtained n-hexyl 2-ethoxybenzoate in the form of an oil having a boiling point of 110 to 112 degrees centigrade at a pressure of 0.15 millimeter of mercury; $n_D^{28} = 1.5011$.

Analysis.—Calcd. for $C_{15}H_{22}O_3$: C, 71.97; H, 8.86. Found: C, 72.22; H, 8.67.

Preparation 29.—n-Hexyl 2-n-propoxybenzoate

Using the procedure described in Preparation 1, but substituting n-hexyl salicylate for n-butyl 4-hydroxybenzoate and 1-bromopropane for allyl bromide, there was obtained n-hexyl 2-n-propoxybenzoate in the form of an oil having a boiling point of 118 to 130 degrees centigrade at a pressure of 0.2 millimeter of mercury; $n_D^{27} = 1.4977$.

Analysis.—Calcd. for $C_{16}H_{24}O_3$: C, 72.69; H, 9.15. Found: C, 72.29; H, 9.10.

Preparation 30.—n-Hexyl 2-n-butoxybenzoate

Using the procedure described in Preparation 12, but substituting n-hexyl salicylate for ethyl salicylate and n-butyl bromide for 1-bromopropane, there was obtained n-hexyl 2-n-butoxybenzoate in the form of an oil having a boiling point of 115 to 116 degrees centigrade at a pressure of 0.05 millimeter of mercury; $n_D^{27} = 1.5014$.

Analysis.—Calcd. for $C_{17}H_{26}O_3$: C, 73.34; H, 9.41. Found: C, 73.45; H, 8.78.

Preparation 31.—n-Butyl 3-allyloxybenzoate n-Butyl 3-hydroxybenzoate was prepared, using the procedure described in Preparation 2(a) but substituting 3-hydroxybenzoic acid for 4-hydroxybenzoic acid and n-butyl alcohol for n-amyl alcohol, in the form of an oil having a boiling point of 127 to 130 degrees centigrade at a pressure of 0.2 millimeter of mercury. Using the procedure described in Preparation 1, but substituting n-butyl 3-hydroxybenzoate for n-butyl 4-hydroxybenzoate, there was obtained n-butyl 3-allyloxybenzoate in the form of an oil having a boiling point of 120 degrees centigrade at a pressure of 0.4 millimeter of mercury; $n_D^{27} = 1.5090$.

Analysis.—Calcd. for $C_{14}H_{18}O_3$: C, 71.77; H, 7.74. Found: C, 71.66; H, 8.14.

Preparation 32.—n-Butyl 3-n-propoxybenzoate

Using the procedure described in Preparation 1, but substituting n-butyl 3-hydroxybenzoate for n-butyl 4-hydroxybenzoate and 1-bromopropane for allyl bromide, there was obtained n-butyl-3-n-propoxybenzoate in the form of an oil which had a boiling point of 111–112 degrees centigrade at a presure of 0.2 millimeter of mercury; $n_D^{27} = 1.4977$.

Analysis.—Calcd. for $C_{14}H_{20}O_3$: C, 71.16; H, 8.51. Found: C, 71.03; H, 8.16.

Preparation 33.—n-Amyl 2-n-propoxybenzoate

Using essentially the procedure described in Preparation 2(a) but substituting 2-n-propoxybenzoic acid for 4-hydroxybenzoic acid, there was obtained n-amyl 2-n-propoxybenzoate identical with the compound obtained in Preparation 23.

Preparation 34.—n-Butyl 2-(2-methallyloxy)benzoate

Using the procedure described in Preparation 12, but substituting n-butyl salicylate for ethyl salicylate and 2-methallyl chloride for 1-bromopropane, there was obtained n-butyl 2-(2-methallyloxy)benzoate in the form of an oil having a boiling point of 110 to 112 degrees centigrade at a pressure of 0.1 millimeter of mercury; $n_D^{27} = 1.5107$.

Analysis.—Calcd. for $C_{15}H_{20}O_3$: C, 72.55; H, 8.12. Found: C, 72.04; H, 7.88.

B. EXAMPLES ILLUSTRATING THE HERBICIDAL COMPOSITIONS OF THE INVENTION

EXAMPLE 1

An emulsifiable concentrate, suitable for dilution with water to give a herbicidal emulsion, was prepared by dissolving twelve grams of Triton X–100 (an alkylaryl polyether alcohol) and four grams of Agrimul 70A (a proprietary mixture of non-ionic surfactants) in 84 grams of n-butyl 2-allyloxybenzoate. To prepare an emulsion containing 6000 parts per million of active ingredient, 27.2 grams of the emulsifiable concentrate so obtained is added to one gallon of water with vigorous stirring. To prepare an emulsion containing 8000 parts per million of active ingredient, 36.2 grams of the above emulsifiable concentrate is added to one gallon of water with vigorous stirring.

In place of the n-butyl 2-allyloxybenzoate employed as active ingredient in the above compositions, there can be employed any other compound having the Formula I as hereinbefore described and exemplified.

EXAMPLE 2

An emulsifiable concentrate, suitable for dilution with water to give a herbicidal emulsion, was prepared by dissolving forty grams of n-butyl 2-n-propoxybenzoate and twenty grams of Triton X–100 in 140 grams of Carbitol (diethylene glycol monoethyl ether). To prepare an emulsion containing 6000 parts per million of active ingredient, 114 grams of the emulsifiable concentrate so obtained is added to one gallon of water with vigorous stirring.

In place of the n-butyl 2-n-propoxybenzoate employed as active ingredient in the above compositions, there can be employed any other compound having the Formula I as hereinbefore described and exemplified.

EXAMPLE 3

A dispersible powder suitable for addition to water to form an aqueous dispersion was prepared by mixing intimately three grams of n-amyl 2-allyloxybenzoate and twenty grams of Microcel 8 (a proprietary calcium silicate having a particle size of the order of five microns). To the product was added 0.5 gram of Pluronic F68 (an ethylene oxide-propylene glycol condensate) and the mixture was macerated to give a fine dry powder. This powder is added to one liter of water to give an aqueous dispersion containing 3000 parts per million of active ingredient.

In place of the n-amyl 2-allyloxybenzoate employed as active ingredient in the above composition there can be employed any other compound having the Formula I as hereinbefore described and exemplified.

It is to be understood that the invention is not to be limited to the exact details of operation or compositions shown and described, as obvious modifications and equivalents will be apparent to one skilled in the art, and the invention is therefore to be limited only by the scope of the appended claims.

I claim:

1. A method of controlling undesired vegetation which comprises applying to the vegetation, in an amount sufficient to exert a herbicidal effect, a compound having the formula:

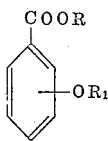

wherein R and R₁ represent lower aliphatic hydrocarbon radicals selected from the class consisting of alkyl having from 1 to 11 carbon atoms, inclusive, alkenyl having from 3 to 11 carbon atoms, inclusive, alkynyl having from 2 to 11 carbon atoms, inclusive, cycloalkyl having from 4 to 11 carbon atoms, inclusive, and cycloalkenyl having from 5 to 11 carbon atoms, inclusive, such that the total number of carbon atoms in the radicals R and R₁ is not less than five and not more than twelve.

2. A method of controlling selectively the growth of crabgrass in the presence of growing desirable vegetation which comprises applying to the vegetation containing crabgrass, in an amount sufficient to exert herbicidal action, a compound having the formula:

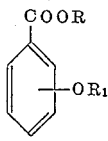

wherein R and R₁ represent lower aliphatic hydrocarbon radicals selected from the class consisting of alkyl having from 1 to 11 carbon atoms, inclusive, alkenyl having from 3 to 11 carbon atoms, inclusive, alkynyl having from 2 to 11 carbon atoms, inclusive, cycloalkyl having from 4 to 11 carbon atoms, inclusive, and cycloalkenyl having from 5 to 11 carbon atoms, inclusive, such that the total number of carbon atoms in the radicals R and R₁ is not less than five and not more than twelve.

3. A method of controlling selectively the growth of crabgrass in the presence of growing desirable vegetation which comprises applying to the vegetation containing crabgrass, in an amount sufficient to exert herbicidal action, a compound having the formula:

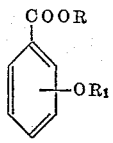

wherein R and R₁ represent lower aliphatic hydrocarbon radicals selected from the class consisting of alkyl having from 1 to 11 carbon atoms, inclusive, alkenyl having from 3 to 11 carbon atoms, inclusive, alkynyl having from 2 to 11 carbon atoms, inclusive, cycloalkyl having from 4 to 11 carbon atoms, inclusive, and cycloalkenyl having from 5 to 11 carbon atoms, inclusive, such that the total number of carbon atoms in the radicals R and R₁ is not less than seven and not more than nine.

4. A herbicidal composition comprising a herbicidally effective amount of n-butyl 2-allyloxybenzoate, a surfactant and a carrier.

5. A herbicidal composition comprising a herbicidally effective amount of n-butyl 2-n-propoxybenzoate, a surfactant and a carrier.

6. A herbicidal composition comprising a herbicidally effective amount of n-amyl 2-allyloxybenzoate, a surfactant and a carrier.

7. A herbicidal composition comprisng a herbicidally effective amount of ethyl 2-n-heptyloxybenzoate, a surfactant and a carrier.

8. A method of controlling selectively the growth of crabgrass in the presence of growing desirable vegetation which comprises applying to the vegetation containing crabgrass, a herbicidal quantity of n-butyl 2-allyloxybenzoate.

9. A method of controlling selectively the growth of crabgrass in the presence of growing desirable vegetation which comprises applying to the vegetation containing crabgrass, a herbicidal quantity of n-amyl 2-allyloxybenzoate.

10. A method of controlling selectively the growth of crabgrass in the presence of growing desirable vegetation which comprises applying to the vegetation containing crabgrass, a herbicidal quantity of n-butyl 2-n-proproxybenzoate.

11. A method of controlling selectively the growth of crabgrass in the presence of growing desirable vegetation which comprises applying to the vegetation containing crabgrass, a herbicidal quantity of ethyl 2-n-heptyloxybenzoate.

12. A method for controlling selectively the growth of undesired vegetation selected from the class consisting of crabgrass, white clover, oxalis, chickweed, foxtail, and *Poa annua*, in the presence of growing desirable vegetation, which comprises applying to the locus to be treated, in an amount sufficient to kill said undesired vegetation without significant damage to the desirable vegetation, a compound having the formula:

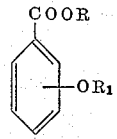

wherein R and R₁ represent lower aliphatic hydrocarbon radicals selected from the class consisting of alkyl having from 1 to 11 carbon atoms, inclusive, alkenyl having from 3 to 11 carbon atoms, inclusive, alkynyl having from 2 to 11 carbon atoms, inclusive, cycloalkyl having from 4 to 11 carbon atoms, inclusive, and cycloalkenyl having from 5 to 11 carbon atoms, inclusive, such that the total number of carbon atoms in the radicals R and R₁ is not less than five and not more than twelve.

References Cited by the Examiner

UNITED STATES PATENTS

| | | | |
|---|---|---|---|
| 2,394,916 | 2/46 | Jones | 71—2.6 |
| 2,396,513 | 3/46 | Jones | 71—2.6 |
| 2,577,969 | 12/51 | Jones | 71—2.6 |

OTHER REFERENCES

King: "Insecticides and Repellants," U.S. Dept. of Agriculture, Agriculture Handbook, No. 69, pages 3–7 and 9–13.

Lespagnol et al. in "Chemical Abstracts," vol. 33, col. 1295 (7), 1939.

Pierce et al. in "Chemical Abstracts," vol. 37, col. 1409 (9), 1943.

King in "Insecticides and Repellants," U.S. Department of Agriculture, Agriculture Handbook No. 69, pages 76 and 77.

JULIAN S. LEVITT, *Primary Examiner.*

G. D. MITCHELL, M. A. BRINDISI, LEWIS GOTTS, *Examiners.*